(12) United States Patent
Stein et al.

(10) Patent No.: US 7,642,518 B1
(45) Date of Patent: Jan. 5, 2010

(54) STABILIZATION OF A SCINTILLATION DETECTOR

(75) Inventors: Jürgen Stein, Wuppertal (DE); Guntram Pausch, Dresden (DE)

(73) Assignee: ICx Technologies GmbH, Solingen (DE)

( * ) Notice: Subject to any disclaimer, the term of this patent is extended or adjusted under 35 U.S.C. 154(b) by 0 days.

(21) Appl. No.: 12/259,111

(22) Filed: Oct. 27, 2008

Related U.S. Application Data

(63) Continuation of application No. 11/128,129, filed on May 10, 2005, now Pat. No. 7,485,868.

(30) Foreign Application Priority Data

May 10, 2004 (WO) ................ PCT/EP2004/050754

(51) Int. Cl.
*G01T 1/164* (2006.01)

(52) U.S. Cl. ................................................ 250/370.11
(58) Field of Classification Search ............. 250/370.11
See application file for complete search history.

*Primary Examiner*—Constantine Hannaher
(74) *Attorney, Agent, or Firm*—IP Strategies

(57) ABSTRACT

A detector for the measurement of radiation, preferably ionizing radiation, includes a medium, means for the conversion of the radiation energy absorbed by the medium into electrical charge, means for digital sampling of the charge signals, means for the determination of a calibration factor K, and means for the stabilization of the output signals of the detector. The medium at least partly absorbs the radiation to be measured. The electric charge is at least partially proportional to the energy of the radiation. The sampling is done preferably with a sampling rate between 1 and 1000 MHz. Further signal processing is digital. The calibration factor K has a fixed relation with respect to the decay time $\tau$ of the medium. The output signals of the detector are mainly proportional to the radiation energy, and are stabilized with the help of the calibration factor K.

21 Claims, 7 Drawing Sheets

Figur 2e

STABILIZATION OF A SCINTILLATION DETECTOR

CROSS-REFERENCE TO RELATED APPLICATIONS

This is a continuation of U.S. patent application Ser. No. 11/128,129, which was filed on May 10, 2005, now U.S. Pat. No. 7,485,868 which in turn claims priority from International Patent Application No. PCT/EP2004/050754, which was filed on May 10, 2004.

FIELD OF THE INVENTION

The invention relates to a method for stabilizing signals, generated by a scintillation detector for the measurement of radiation, preferably ionizing radiation, after it has absorbed the radiation at least in part within the detector and whereas those signals are dependent from the operation temperature of the detector. The invention also relates to a detector for the measurement of radiation, preferably ionizing radiation.

BACKGROUND OF THE INVENTION

Respective methods and detectors are known in the prior art. A scintillator in a scintillation detector absorbs the radiation to be measured, thereby generating excited states within the scintillator. Those excited states decay with a decay time $\tau$ under the emission of light, whereas the amount of light is a measure for the absorbed energy of the incoming radiation. The light is directed to a photocathode, emitting electrons in dependence of the amount of light, being absorbed there, being usually amplified by photomultiplier. The output signal of the photomultiplier therefore is a measure for the total energy of the absorbed radiation.

It is known that the light output of a scintillator is dependent from its temperature, so that the output signal, being proportional to the measured energy, is also dependent from the temperature of the scintillator. As it is often not possible to operate the scintillation detector at a constant known temperature, the detector's accuracy of measurement is substantially impaired by the temperature changes.

According to the known prior art, this is achieved by a calibration, being applied before or after the measurement, whereas a so called calibration source, that is a radiation source with a known energy of radiation, is used for calibration. As an alternative or in addition, the calibration may be effected on the basis of known lines with known energy, being present in the measured spectrum.

This has the disadvantage that temperature changes, occurring between the time of calibration and the time of measurement, lead to an additional uncertainty of the measurement. Especially with detectors, being used under changing external operation conditions, especially outside of a laboratory, this disadvantage is of importance. Furthermore, it has often to be assumed, especially in security engineering—contrary to classical research applications—that they are not enough lines of previously known energy present within the spectrum, so that the measured spectrum has to be evaluated in advance in order to be able to allocate specific energies to single measured lines. Because of possible incorrect allocations, this is subject to errors. As the security personal usually has no nuclear physics knowledge, the allocation of single lines of the measured spectrum to specific known energies is a difficulty in addition.

Applicant therefore developed a scintillation detector and a method for operation of such a detector, in which the known energy of a calibration source can be measured continuously, or, as the case may be, in defined, comparably short time gaps, by the detector so that the detector could be calibrated during the measurement with the known energy of the radiation of the calibration source. Therewith it is possible also for persons without physics knowledge to collect a spectrum of ionizing radiation with high accuracy.

The radiation within the energy range of the radiation, being emitted from the calibration source, is nevertheless superposed by exactly this radiation of the radiation source and therefore not measured in an optimal manner. In case one does not calibrate the detector continuously, but, alternatively in larger time gaps, the radiation within the energy range of the calibration source could be measured also, nevertheless at the same time the energy resolution becomes worse by temperature changes not being picked up. Therefore, it is for principle reasons very difficult to achieve a high energy resolution by a continuous calibration with at the same time high sensitivity in the complete energy area, that is also in the area of the radiation, being emitted by the calibration source.

An additional problem is that, in order to calibrate for the measurement of an ionizing radiation, usually a radioactive calibration source is necessary, which usually is part of the detector if it is used for security engineering. This requires substantial efforts during the production of respective detectors. Because of continuously rising safety measures and the desire to avoid radioactive material as far as possible, there therefore is a need to calibrate scintillation detectors without the use of radioactive material.

BRIEF SUMMARY OF THE INVENTION

It is therefore the object of the present invention to provide a method for the calibration of a scintillation detector as well as a scintillation detector, avoiding the described disadvantages of the known prior art and especially allowing for a calibration during the current measurement across the complete energy spectrum with at the same time high calibration accuracy. A further object of the invention is to allow the calibration of a scintillation detector for the measurement of ionizing radiation without having to use a radioactive calibration source.

This problem is, according to the invention, solved by a detector according to the characterizing part of the independent claims.

According to this, a temperature dependent calibration factor K is determined directly from the shape of the signals, being generated by the radiation to be measured itself. In a specific embodiment of this method, the calibration factor K is chosen in a predetermined ratio with respect to a pulse form parameter P, whereby the pulse form parameter P is obtained by evaluating the shape of the registered detector signals and whereby the evaluated detector signals are dependent from the time decay constant $\tau$ of the scintillation light, being generated within the scintillation detector. It has been proven an advantage to determine the pulse form parameter P from at least one of the following characteristics: peaking time of the unipolar formed output signal of the detector, rise time of the unipolar formed output signal of the detector and/or the time between the begin of the signal and the zero crossing of the bipolar formed output signal of the detector.

It has been proven as an advantage to determine the calibration factor K with the following method steps: generating a charge signal L from the excited states, being generated by the at least partly absorption of the radiation within the detector and decaying with a decay time constant $\tau$, determining the rise time of the charge signal L, being substantially proportional to the decay time constant τ, and determining the calibration factor K from the rise time of the charge signal L. Alternatively, a current signal S could be generated from the initially generated signal, so that the length and the decay time of the current signal S is substantially proportional to the decay time constant τ. The calibration factor K is then determined from the length or the parameters of the decay time of the current signal S.

The pulse form parameter P may be determined electronically by signal processing. It is, nevertheless, especially advantageous if the signal processing is done digitally, whereas it is an advantage to digitally sample the electric charge signal L and/or the current signal S, whereas the sampling preferably occurs with a sampling rate between one and 1000 MHz, especially preferred with a sampling rate between 5 and 100 MHz and even more preferred with 5 to 25 MHz. Best results have been achieved by using 7 MHz as a sampling rate. Specifically advantageous is to generate the pulse form parameter P in a numerical manner.

In addition it is especially advantageous if the calibration factor K for the stabilization of the measured signals is determined with the help of a predetermined mathematical function from the pulse form parameter P, whereas the predetermined function is preferably mainly linear or polymeric. The predetermined function may be stored in the detector in a readable manner. It is also possible to correlate the calibration factor K for the stabilization of the measured signals with a predetermined calibration table, containing the pulse form parameter P. It is an advantage if this calibration table is stored in a readable manner in the detector. The determination of the calibration factor K from the pulse form parameter P does occur in a specifically preferred embodiment of the method during the measurement in real time.

Furthermore, a detector for the measurement of radiation, preferably ionizing radiation, is disclosed, in which the output signals, being mainly proportional to the energy of the radiation, are stabilized by a method described above.

Object of this invention is also a detector for measurement of radiation, preferably ionizing radiation, comprising at least a medium, at least partly absorbing the radiation to be measured, as well as means for conversion of the radiation energy, absorbed by this medium, into electrical charge, whereas the electric charge is at least partially proportional to the energy of the radiation or correlates at least in a predetermined ratio to the absorbed radiation energy. In addition, the detector comprises means for the determination of a calibration factor K, having a fixed relation with respect to the decay time constant τ of the medium, and means for the stabilization of the output signals of the detector, being mainly proportional to the radiation energy, with the help of the calibration factor K.

It is advantageous, if the detector comprises the following means in order to determine the calibration factor K: means for determining the rise time of the charge signal L, preferably by conversion of the charge signal L into a current signal S, preferably by differentiating and determining the decay time of the current signal S, being proportional to the rise time of the current signal L whereby the rise time of the current signal L is a measure for the decay time constant τ of the excited states in the medium, absorbing the radiation, and means for the determination of the calibration factor K, having a mainly fixed relation with respect to the decay time constant τ of the medium, from the rise time of the charge signal L.

As medium, absorbing the radiation, preferably a scintillation crystal is used, preferably sodium iodide (NaI), cadmium wolframate (CWO), caesium iodide (CsI), bismuth germanate (BGO) or, especially preferred, lanthanum chloride ($LaCl_3$) or lanthanum bromide ($LaBr_3$).

The means for converting energy, absorbed by the medium, being at least in part proportional to the radiation energy, into electric charge, preferably comprise a light detector, for example, a photomultiplier, comprising a photocathode with a photomultiplier coupled to it, or a photodiode, especially preferable with a charge sensitive pre-amplifier coupled thereto, or a hybrid photomultiplier or an avalanche photodiode, whereas the electric charge is converted into a current signal S by using a pulseforming and amplifier circuit. Thereby a time t between two defined points in the bipolar modified signal is measured, preferably between that point of the rising flank of the signal, at which it has achieved a third of its full maximum, and the point, at which the signal height is 0 Volt, whereby the so measured time t is a measure for the decay time constant τ. The time of the zero crossing of the bipolar signal is also denominated as $t_{ZC}$.

In another embodiment, the signal processing occurs digitally, whereas the digital signal sampling is preferably done with a sampling rate between 1 and 1000 MHz, especially preferable with a sampling rate between 5 and 100 MHz and explicitly preferred with a sampling rate between 5 and 25 MHz, whereas a sampling rate of 7 MHz proved to be very good.

After such a sampling has been done, the parameters of the exponential decaying flank of the current signal S, being a direct measure for the decay time constant τ, can be determined within the detector by digital signal processing. It has proven an advantage to scale the parameter, being proportional to the decay time constant τ, with a calibration table and to correct the measured signals with the resulting value in order to calibrate the measured values and to use them to stabilize the detector.

The charge q measured at the electric output of the detector, which usually is the output of the photomultiplier, thereby is dependent on following other dimensions:

$$q = E * w_{scnt}(T) * \epsilon_{opt} * S_{phK}(\lambda, T) * V_{PMT}(U_A, T, N, \text{Hist})$$

Therein, E stands for the energy of the particle to be measured, $w_{scnt}$ for the light output of the scintillator, $\epsilon_{opt}$ for the optical efficiency of the light collection at the photocathode of the scintillator, $S_{phk}$ for the sensitivity of the photocathode coupled directly to the scintillator and $V_{PMT}$ for the own amplification of the photomultiplier. It turns out that the light output depends on the temperature $T_S$ of the scintillator and the sensitivity of the photo cathode depends on the temperature $T_F$ of the photocathode, whereas the photocathode is usually thermally directly connected to the scintillator, so that only the common temperature $T = T_F = T_S$ is to be viewed, whereas the sensitivity of the photocathode is, in addition, a function of the wave length λ.

The own amplification of the photo multiplier $V_{PMT}$ depends from the operation voltage $U_A$, the temperature T, the counting rate N and non-linear effects from the history Hist of the detector. In the following those dependencies will be ignored.

It is known from J. S. Schweitzer and W. Ziehl, IEEE Trans. Nucl. Sci. NS-30(1), 380 (1983), that the decay time constant τ of the excited states depends from the temperature of the crystal.

From JP 06-258 446 A, a detector system is known, where the optical scintillator and the electrical equipment, including the light detector, are separated in space. Disclosed is a photoconductive wave guide scintillator, comprising a scintillator, a wave length shifter and a wave guide. In addition, this patent application discloses a temperature correction for this photoconductive wave guide scintillator when it is used as part of a system in combination with a preamplifier.

A disadvantage of JP 06-258 446 A is that the proposed advantage, namely the separation of scintillator and photomultiplier, leads to specific negative effects, as temperature changes of the photomultiplier cannot be dealt with. In addition, the disclosure requires complicated electronic equipment, as the output signal of the photomultiplier has to be split in order to allow for a separate and distinguished evaluation electronics—one handling the measurement, the other one handling the temperature evaluation. This leads not only to a complicated, large and expensive setup, but the separate individual handling of the various signals also leads to additional sources of error. Furthermore, the temperature correction is based on a determination of the damping time of the light in the scintillator, that is on a parameter which is difficult to determine directly, depending on the used electronics.

The present invention is now, for the first time, identifying further parameters, showing a fixed relationship to the decay time constant $\tau$. With the present method, the crystal temperature T and/or calibration factors K are determined during the running measurement from those parameters, and are used to stabilize the detector.

The very specific here is that this stabilization cannot only be done online during the running measurement, but that the calibration factors K could be derived directly from the form of the signals to be measured themselves, so that no radioactive calibration source is needed for stabilization and that there is no need for a signal split, that is for a separate handling of signals with additional hardware, resulting in a much simpler, more efficient, reliable and cheaper electronics. More specifically, the use of a preamplifier can be avoided.

Therefore, this method is, already because of the continuous opportunities for stabilization, more exact than the known methods using a calibration source for principal reasons. At the same time no calibration source is necessary so that the use of radioactive material can be omitted and, in addition, the complete resolution of the energy spectrum of the radiation to be measured is available, including where otherwise the signals of the calibration source occur and hinder the measurement of low doses.

BRIEF DESCRIPTION OF THE DRAWINGS

In the following, a specific embodiment is discussed along FIGS. 1 to 5. They show.

DETAILED DESCRIPTION OF THE INVENTION

Figure 1:
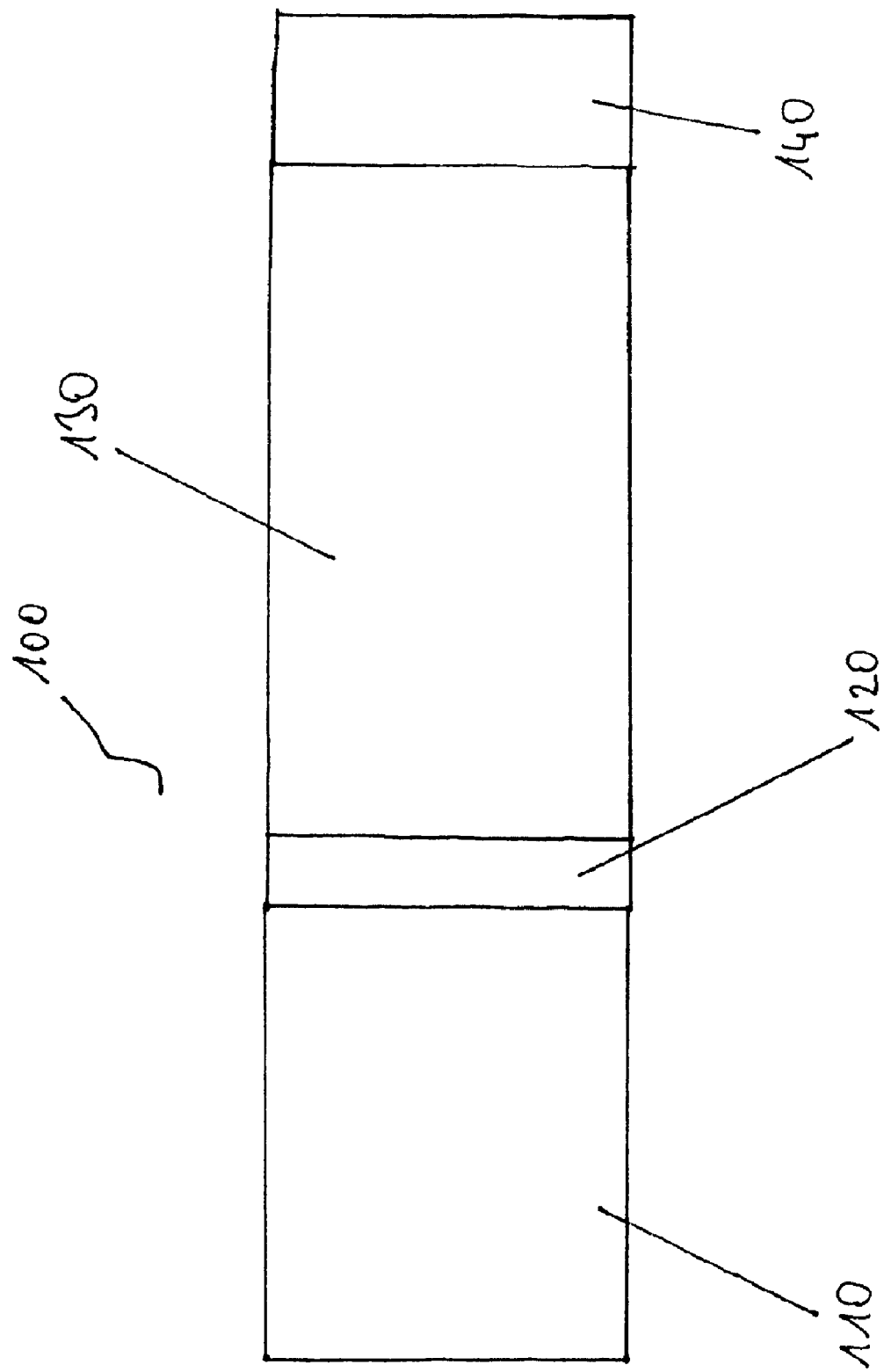
FIG. 1: a schematic setup of a scintillation detector with a photomultiplier.

FIG. 1 exemplarily shows the schematic setup of a scintillation detector 100. Shown are the scintillation crystal 110, the photocathode 120 and the photomultiplier 130. The radiation is absorbed at least in part by the scintillation crystal and is generating excited states in there, decaying again under the emission of photons. Those hit the photocathode 120, emitting electrons in dependence of the amount of induced light, which again are multiplied by a photomultiplier 130. The output signal of the photomultiplier 130 then is further processed in order to finally provide an output signal related to the absorbed energy of the radiation, which is further processed in the evaluation electronics 140.

The light emission occurs together with the decay of the excited states and therefore mainly exponential with a decay time constant $\tau$. FIGS. 2a to 2e show the calculated simulated light emission for two incidences with different decay time constants ($\tau_A$=100 ns, $\tau_B$=150 ns) and the following signal processing.

Figure 2A:
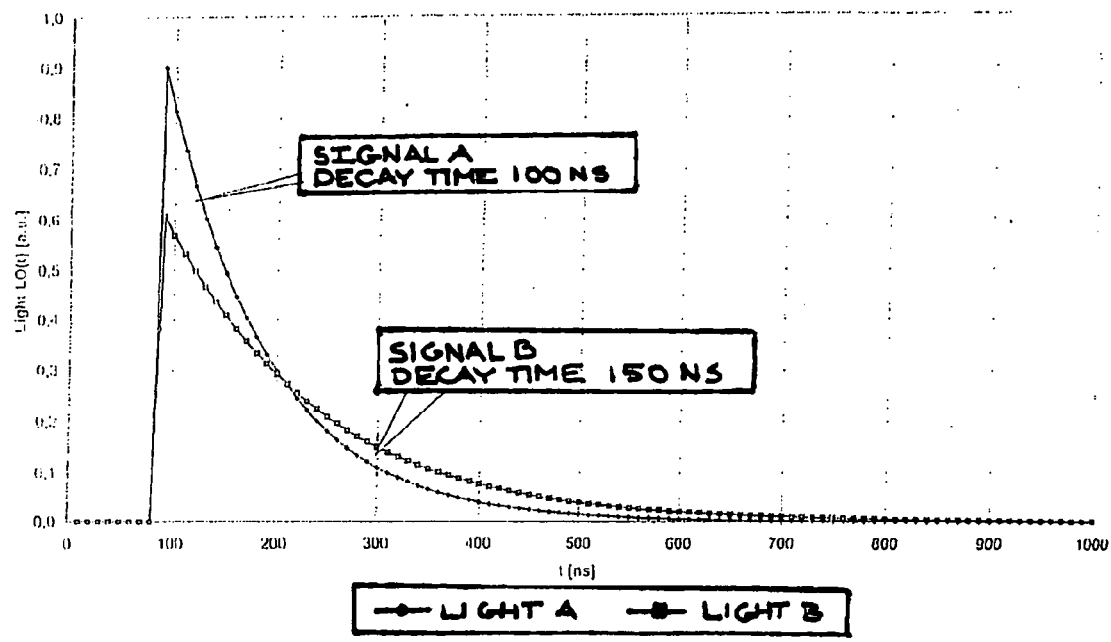
FIG. 2a: light emission across the time, shown for two incidences with varying decay time constants, but with the same amount of light (energy)
Figure 2B:
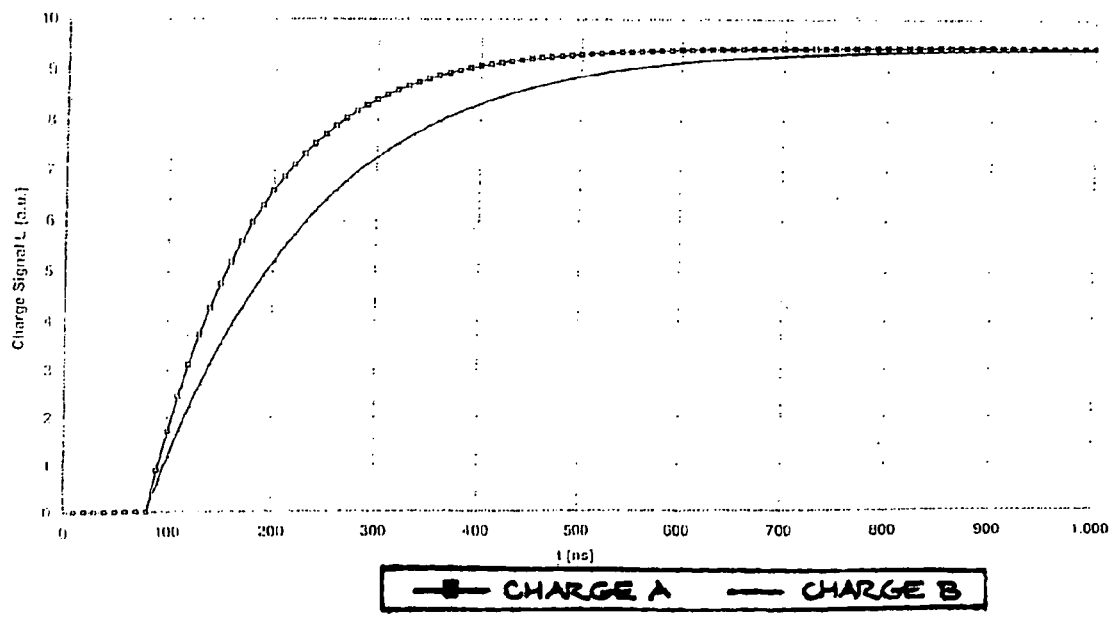
FIG. 2b: charge signal L(t) for the two incidences of FIG. 2a, FIG. 2c: current signal S(t) for the two incidences of FIG. 2a, FIG. 2d: bipolar signal B(t) for the two incidences of FIG. 2a, FIG. 2e: unipolar signal U(t) for the two incidences of FIG. 2a, FIG. 2f: charge signal L(t) with and without RC discharging for a row of incidences.

The distribution of the light emission over the time is shown in FIG. 2a. The charge q, collected completely up to the time t, can be seen in the current signal L(t) (FIG. 2b). The height of the charge signal L(t) after the light pulses have been decayed (in FIG. 2b: roughly after 1000 ns) is a measure for the amount of the totally emitted photons and therefore for the energy E to be measured, whereas the steepness of the rising flank of the charge signal L reflects the decay time constant of the scintillation material.

Figure 2C:
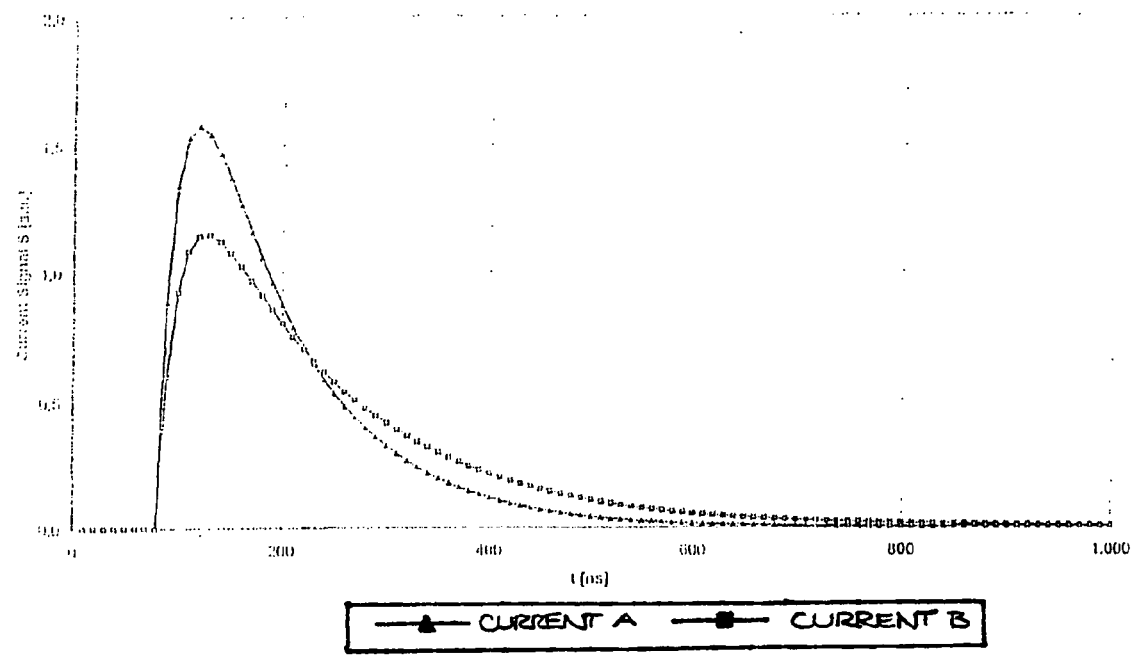
Figure 2D:
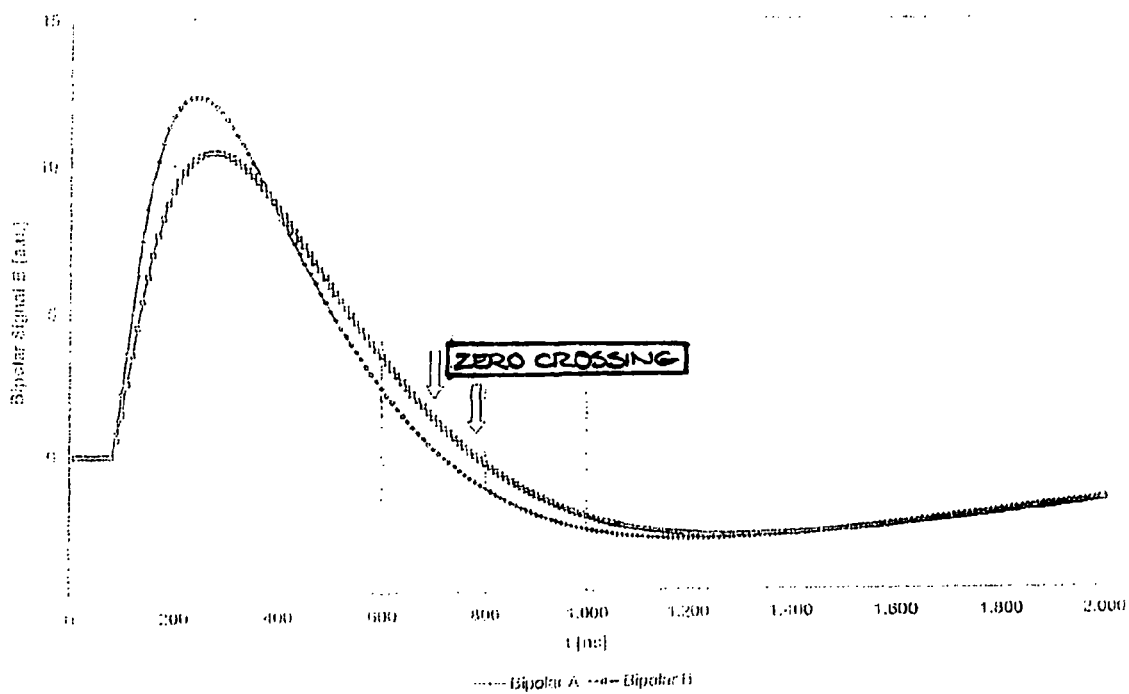
Figure 2F:
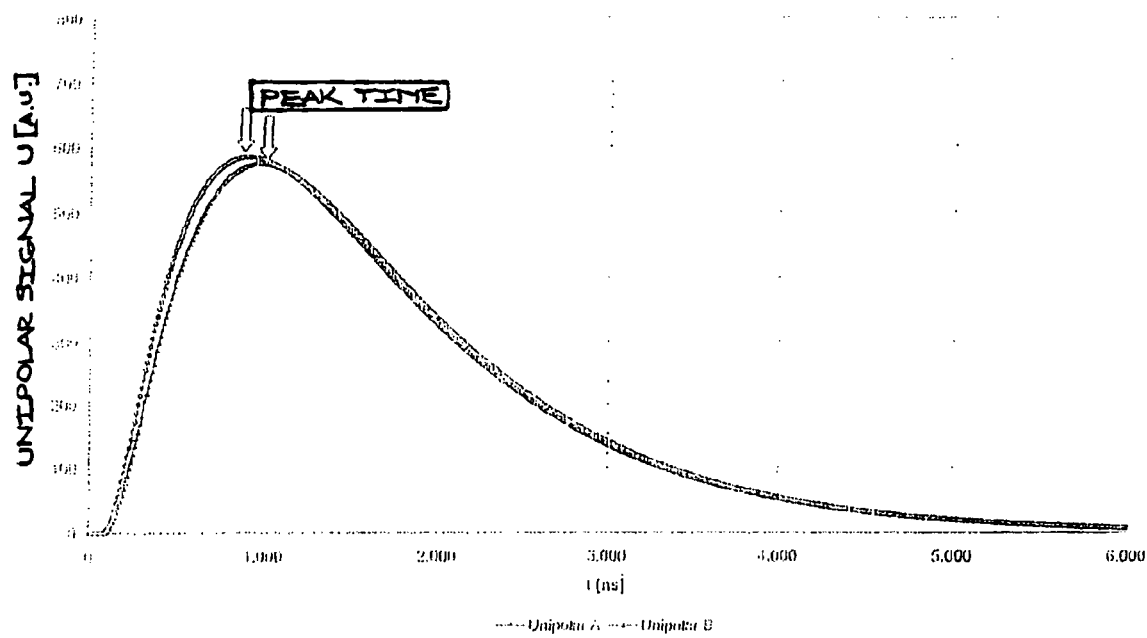
Figure 2F:
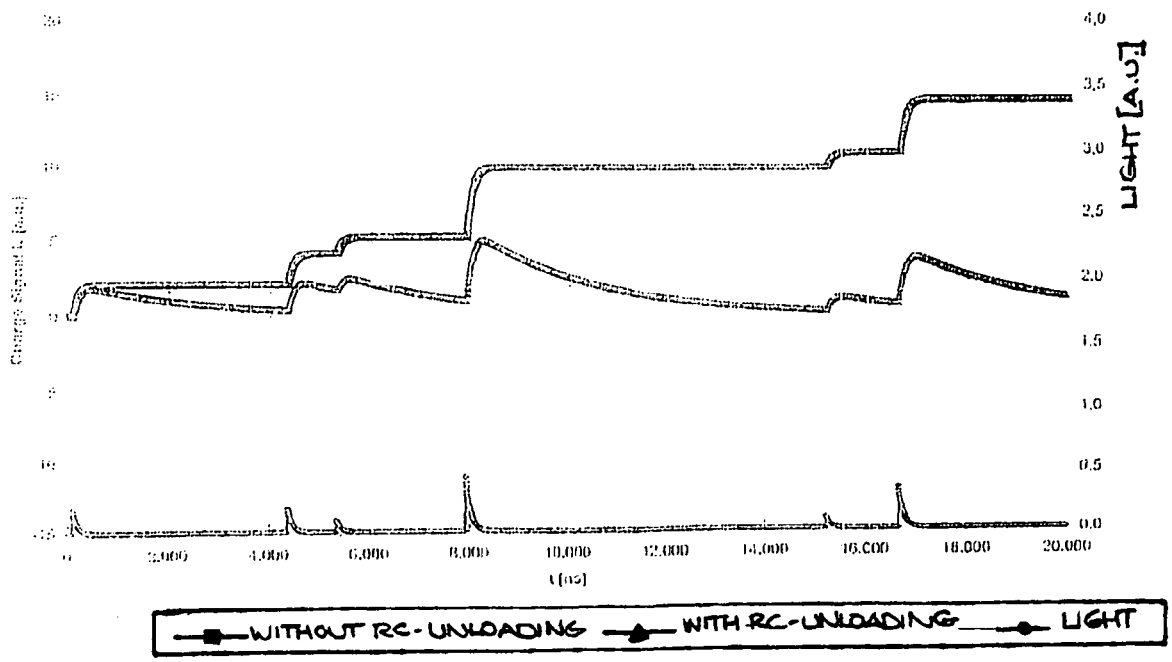

As can be seen from FIG. 2f, several consecutive signals would lead to the result that the charge signal would rise steadily (diagram "without RC-discharge"). For technical reasons, the charge signal therefore is discharged usually via an RC-element with an electronic time constant $\Theta$, being large compared to $\tau$ (diagram "with RC-discharge"). Nevertheless, this discharge is of no importance for the following principle discussion, so that FIG. 2b does not show this detail for the purpose of clearness.

The time-wise distribution of the light emission can be reconstructed nearly in an electronic manner by differentiating the charge signal L(t), preferably electronically with usual pulse forming and amplifier circuits, therefore resulting in a current signal S(t) (FIG. 2c). The information concerning the decay time constant $\tau$ can be extracted from the form and length of the current signal S(t).

By consecutive integration and differentiation steps, preferably done electronically with usual impulse forming and amplification circuits, the initial charge or current signal can be further formed into a bipolar signal B(t) (FIG. 2d) or into a unipolar signal U(t) (FIG. 2e).

From FIG. 2d it becomes clear that the time of the zero crossing in the bipolar signal B(t) depends on the decay time constant $\tau$. The zero crossing time can be measured very exactly with a zero crossing detector. It is independent of the amplitude of the signal and therefore independent of the energy of the detected particle as well as of shifts of the signal amplification.

FIG. 2e demonstrates that the decay time constant $\tau$ is determined by both, the rising as well as the peaking time of the unipolar signal U(t), that is the time in which the maximum of the signal has been reached. Again, these parameters can be measured with electronic circuits according to the prior art.

All methods as described above could be used for the determination of the decay time constant τ or of the temperature of the scintillation crystal correlated therewith or of a correction factor K, depending on the temperature which could be used to stabilize the detector, from the form of the detector signal. The embodiment as described in the following is demonstrating this principle in a specific case:

A scintillation detector, consisting of a NaI(Tl)-crystal with a photomultiplier coupled thereto, is exposed to radioactive radiation. The signals of the photo multiplier are formed in a bipolar manner according to FIG. 2d and then sampled digitally with a sampling rate of $f_{sampl}$=25 MHz. The zero crossing time $t_{ZC}$ is determined for every detected signal by the time $t_1$, at which the signal front is reaching the third part of the signal maximum, the time $t_2$, at which the signal is crossing the zero line, and finally the difference $t_{ZC}=t_2-t_1$ numerically calculated from the single sampling points.

By using suitable numerical methods, in the presented case by linear interpolation between the single sampling points, the zero crossing time $t_{ZC}$ can be determined with an uncertainty $\Delta t$, being substantially smaller than the sampling interval ($\Delta t <<1/f_{sampl}$).

The maximum of the bipolar signal is used as a measure for the energy E.

During the measurement, a zero crossing time spectrum, generated by a pulse height analysis of the parameter $t_{ZC}$, is generated in addition to the energy spectrum, generated by pulse height analysis of the parameter E.

Figure 3:
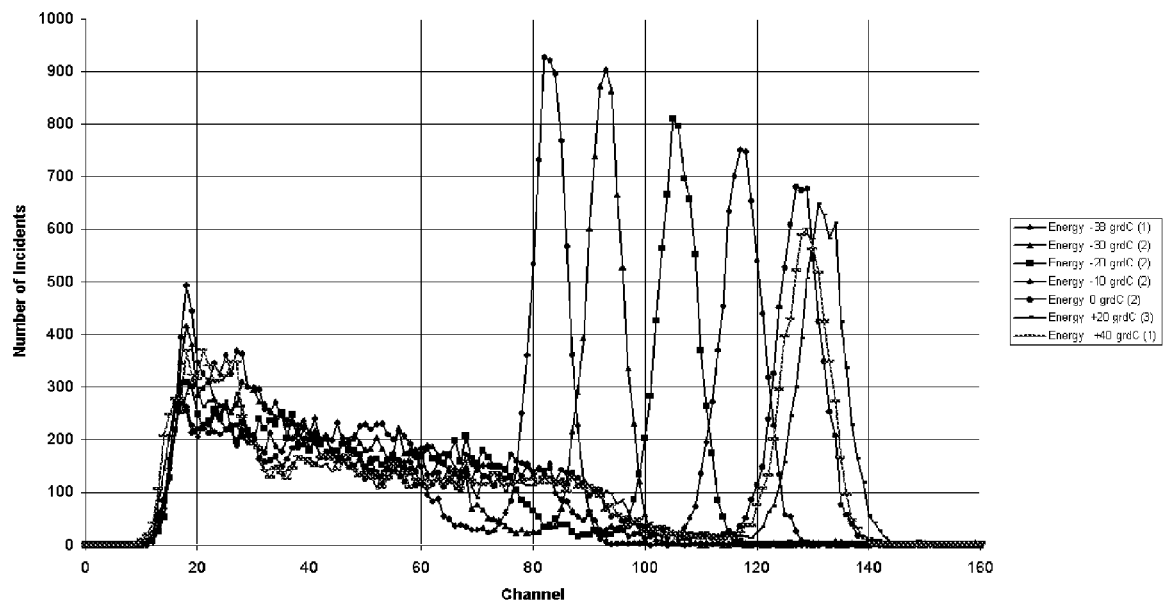
FIG. 3: energy spectrum of a $^{137}Cs$ source, taken by various temperatures.
Figure 4:
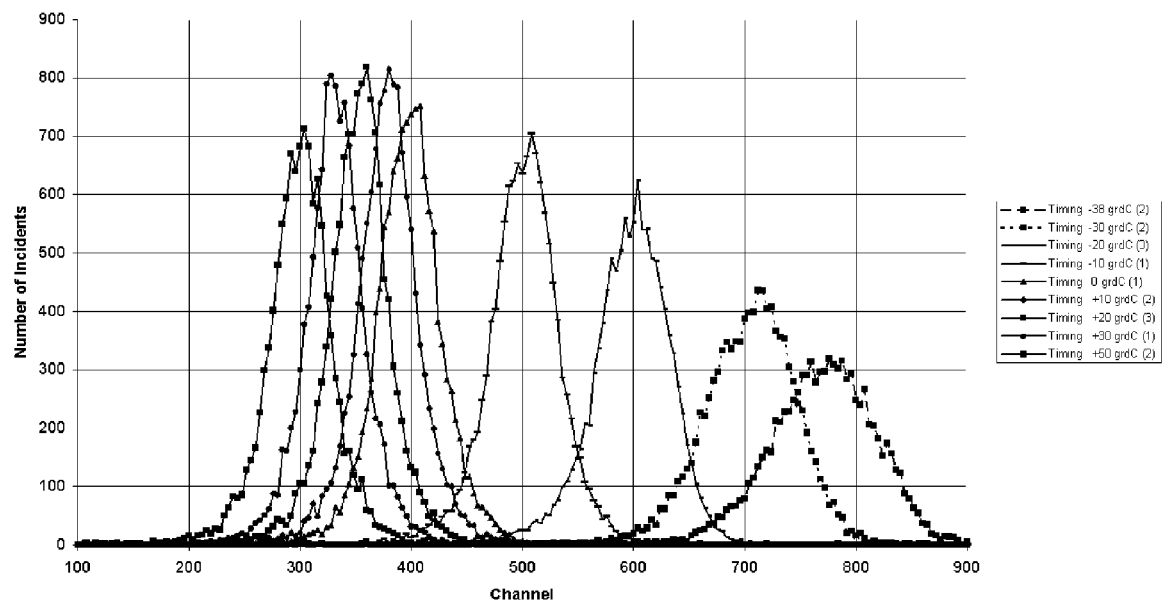
FIG. 4: zero crossing time spectra, being taken along with the energy spectra according to FIG. 3, FIG. 5a: average zero crossing time $<t_{ZC}>$ as a function of the temperature of the detector system.

FIG. 3 shows energy spectra, which have been measured with the detector after radiating it with a $^{137}$Cs source at different temperatures. FIG. 4 shows the zero crossing spectra being measured with this system at the same time.

Figure 5A:
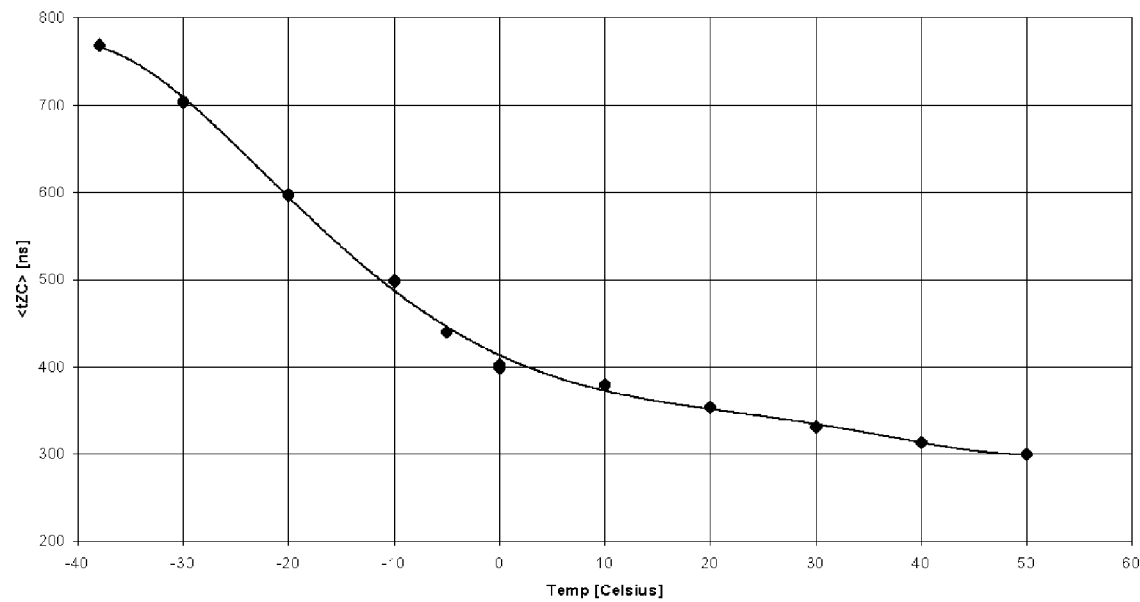
FIG. 5b: position of the 662-keV peak within the energy spectrum according to FIG. 3 as a function of the temperature of the detector system.
FIG. 5c: position of the 662-keV peak in the energy spectrum as a function of the average zero crossing time $<t_{ZC}>$.
FIG. 5d: correction factor K as a function of the zero crossing time $<t_{ZC}>$.
Figure 5B:
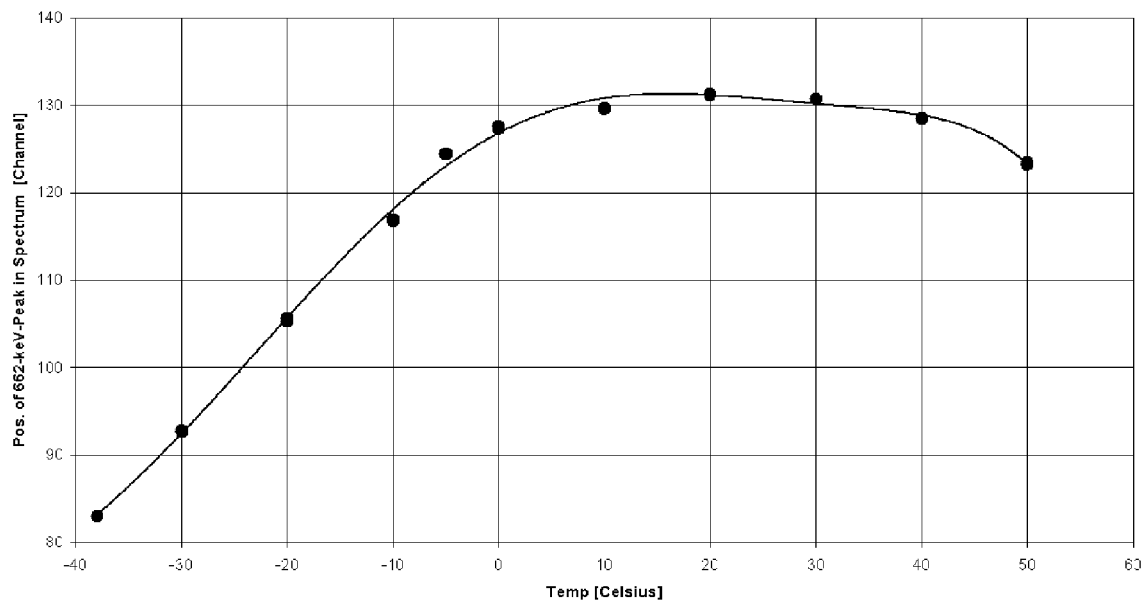
Figure 5C:
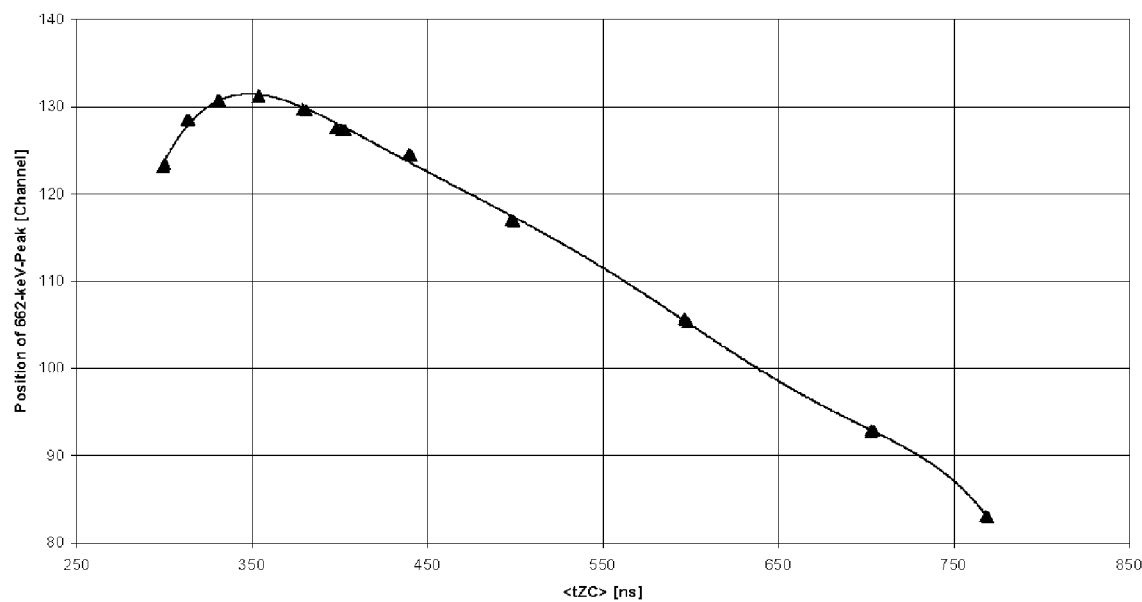

In FIG. 5a the average zero crossing time $<t_{ZC}>$ is determined by calculating the center of gravity of the single zero crossing time spectra as a function of the related temperature of the detector system. $<t_{ZC}>$ is distinctly correlated with the temperature of the detector system. As expected and known already, the position of the 662-keV peak within the energy spectrum depends on the temperature (FIG. 5b). This effect has to be compensated by a correction factor K. In order to do so, one can at first show the position of the 662-keV peak as a function of the parameter $<t_{ZC}>$. FIG. 5c demonstrates that this function is of such a condition that the position $X_{662}$ of the 662-keV peak can be predicted clearly from $<t_{ZC}>$.

Figure 5D:
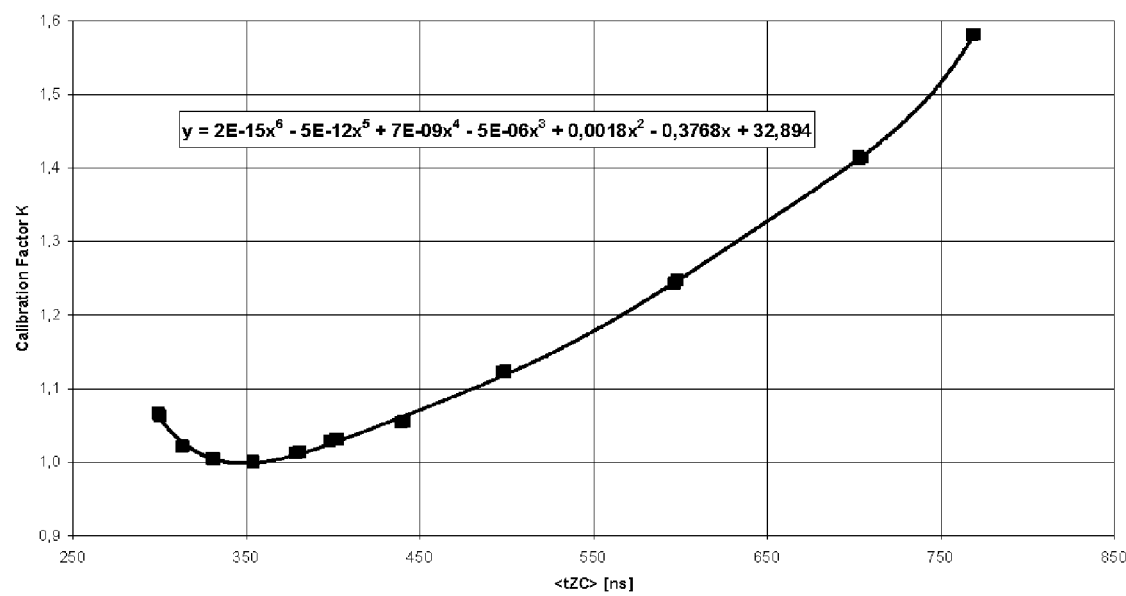

With the help of the correction factor $$K(<t_{ZC}>)=X_{662}(350\ ns)/X_{662}(<t_{ZC}>)$$

the actual position of the peak can be corrected in such a way that $$K(<t_{ZC}>)*X_{662}(<t_{ZC}>)=X_{662}(350\ ns)=const.$$

is true—that is the corrected peak position is independent from $<t_{ZC}>$ and therefore independent from the temperature of the detector system. For the specific detector system, a correction factor K is calculated, being shown in FIG. 5d. This function has to be determined individually for every detector.

The calibration factor K, being determined during the measurement from the shape of the measured signals themselves, being mostly independent from the energy E of the measured radiation, can either be stored in a table within the detector, so that the stabilization can occur on the basis of the data already stored in that table. It is also possible, as shown exemplarily above, to catch the dependency in a functional manner and to store the function in the detector and to stabilize it by using the function.

In a further embodiment the rise time $t_r$ of the signal according to FIG. 2c can be determined as a pulse form parameter P. Suitable for the method according to the invention are, nevertheless, all other parameters, which do show a predetermined correlation to the decay time τ.

Multiple possibilities are available in case the signal processing does not occur analog but digital. In this case, the output signal of the photomultiplier or the charge sensitive preamplifier is sampled digitally with a sampling rate of 25 MHz in one embodiment of this invention. Measurements confirm that this sampling rate is already sufficient in order to achieve sufficiently exact results.

The digital signals are technically easier and cheaper to evaluate than the comparable analog signals. For example, the conversion in a bipolar signal, which zero crossing time $t_{ZC}$ can easily be measured with analog devices, can be omitted as a equally suitable pulse form parameter can be derived directly from the digitized output signal of the photomultiplier also. In addition, the processing of the measured signals and their evaluation, for example with a multi channel analyzer VKA, is preferred in case the measured signals are available digitally already.

This embodiment, especially FIG. 5a, shows that the dependence of the pulse form parameter $t_{ZC}$ is sufficiently distinctive especially for the interesting area of temperature of −15° C. to +55° C.

The method according to the invention, nevertheless, cannot only be used for detectors. As the pulse form parameter P is always a measure for the crystal temperature T, this method could also be used to operate a thermometer. As radiation source usually the background radiation, being present anyway, is sufficient. As the measurement is not depending on the radiation energy, a stabilization of the measured energy is not necessary.

The advantage of such a thermometer is that at the place of measurement, no supply of energy, in addition to the background radiation being present anyway, is necessary in order to operate the thermometer, so that the temperature of the object to be measured is not influenced by the measurement itself.

Such temperature measurements can be used within the detector itself for calibration of other components also, but they also could be used outside the detector.

This is especially true as no mechanical but only an optical coupling between the scintillator and the light detector is necessary. This suggests exploiting small scintillator samples, excited by background radiation or radioactive seeds, as contact-free, passive (remote) thermometers which are distinguished by zero power consumption. Such probes are very useful in thermally well insulated environments such as a vacuum.

Another application of the invention is a position sensitive detector. If a scintillator crystal is provided with a static temperature field gradient, for example by keeping crystal faces at different but fixed temperatures, the decay time of the individual signals does provide additional position information.

The method of this invention can also be used to investigate the properties of various scintillation materials. For example, the dependence of the scintillation decay time on parameters like temperature, chemical composition, radiation type and the like can easily and in a very inexpensive manner be measured with the inventive method.

Last but not least, it is possible to adapt the filter parameters, especially used in digital signal processing, to the actual conditions during the measurement, therefore allowing for an adaptive filtering.

The invention claimed is:

1. A method of stabilizing signals generated by a scintillation detector that measures radiation, wherein the signals are dependent on an operating temperature of the detector, comprising:

absorbing the radiation at least in part within the detector;

determining, at least in part within the detector, a temperature-dependent calibration factor based on a shape of signals generated by the absorbed radiation;

generating an output signal corresponding to an energy level of the absorbed radiation by receiving light at the detector, measuring a decay time of the signals generated by the absorbed radiation corresponding to the received light, and providing a signal corresponding to the measured decay time, all at least in part within the detector;

determining a pulse form parameter by evaluating a shape of the output signal, at least in part within the detector; and applying the calibration factor to the output signal according to a ratio with respect to the pulse form parameter in order to stabilize the output signal, at least in part within the detector.

2. The method of claim 1, wherein the radiation is ionizing radiation.

3. The method of claim 1, where the pulse form parameter is determined by evaluating at least one of a length of a unipolar-formed output signal of the detector, a rise time of the unipolar-formed output signal of the detector, and a time between a beginning of the output signal and a zero crossing of a bipolar-formed output signal of the detector.

4. The method of claim 1, wherein determining the calibration factor includes generating a charge signal from the signals generated by the absorbed radiation, determining a rise time of the charge signal, wherein the rise time of the charge signal is substantially proportional to the decay time of the signals generated by the absorbed radiation, and determining the calibration factor based on the rise time of the charge signal.

5. The method of claim 4, further comprising digitally sampling the charge signal.

6. The method of claim 5, wherein the charge signal is sampled at a sampling rate that is between 1 MHz and 1000 MHz.

7. The method of claim 6, wherein the charge signal is sampled at a sampling rate that is between 5 MHz and 100 MHz.

8. The method of claim 7, wherein the charge signal is sampled at a sampling rate that is between 5 MHz and 25 MHz.

9. The method of claim 1, wherein determining the calibration factor includes generating a current signal such that a length and a decay time of the current signal are substantially proportional to the decay time of the signals generated by the absorbed radiation, and determining the calibration factor based on one of the length and the decay time of the current signal.

10. The method of claim 9, further comprising digitally sampling the current signal.

11. The method of claim 10, wherein the current signal is sampled at a sampling rate that is between 1 MHz and 1000 MHz.

12. The method of claim 11, wherein the current signal is sampled at a sampling rate that is between 5 MHz and 100 MHz.

13. The method of claim 12, wherein the current signal is sampled at a sampling rate that is between 5 MHz to 25 MHz.

14. The method of claim 1, where the pulse form parameter is determined in a numerical manner.

15. The method of claim 1, where the calibration factor is determined using a predetermined mathematical function based on the pulse form parameter.

16. The method of claim 15, wherein the predetermined function is mainly linear.

17. The method of claim 16, further comprising storing the predetermined function in the detector in a readable manner.

18. The method of claim 15, wherein the predetermined function is mainly polynomic.

19. The method of claim 1, wherein applying the calibration factor to the output signal according to a ratio with respect to the pulse form parameter includes correlating the calibration factor with a predetermined calibration table that includes the pulse form parameter.

20. The method of claim 19, further comprising storing the calibration table in the detector in a readable manner.

21. The method of claim 1, wherein the application of the calibration factor to the output signal according to a ratio with respect to the pulse form parameter is performed during radiation measurement by the scintillation detector in real time.

* * * * *